(12) United States Patent
Oda et al.

(10) Patent No.: US 12,351,430 B2
(45) Date of Patent: Jul. 8, 2025

(54) AUTONOMOUS MOBILE SYSTEM, AUTONOMOUS MOBILE METHOD, AND AUTONOMOUS MOBILE PROGRAM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 947 days.

(21) Appl. No.: 17/494,325

(22) Filed: Oct. 5, 2021

(65) Prior Publication Data

US 2022/0194737 A1 Jun. 23, 2022

(30) Foreign Application Priority Data

Dec. 21, 2020 (JP) ................................ 2020-211485

(51) Int. Cl.
*B66B 1/34* (2006.01)
*B60W 60/00* (2020.01)
(Continued)

(52) U.S. Cl.
CPC ....... *B66B 1/3407* (2013.01); *B60W 60/0025* (2020.02); *B66B 1/2408* (2013.01);
(Continued)

(58) Field of Classification Search
CPC ... B66B 1/3407; B66B 5/0012; B66B 1/2408; B66B 1/3461; B66B 1/3476;
(Continued)

(56) References Cited

U.S. PATENT DOCUMENTS

2019/0144238 A1* 5/2019 Osawa ................. B66B 1/2458
187/387
2022/0017332 A1* 1/2022 Kim ........................ B66B 13/14
(Continued)

FOREIGN PATENT DOCUMENTS

JP 04-091970 U 8/1992
JP H07-215604 A 8/1995
(Continued)

OTHER PUBLICATIONS

Tanida, Elevator Apparatus, Elevator System, And Control Method for Elevator Apparatus, Jul. 27, 2020, EPO, JP 2020111394 A, Machine Translation of Description (Year: 2020).*

*Primary Examiner* — Drew J Brown
*Assistant Examiner* — Matthew D Lee
(74) *Attorney, Agent, or Firm* — Dinsmore & Shohl LLP

(57) ABSTRACT

An autonomous mobile method for an autonomous mobile device according to the present embodiment is an autonomous mobile method for an autonomous mobile device that autonomously moves in a facility provided with an elevator. When the total number of the autonomous mobile devices including other autonomous mobile devices in a car of the elevator is larger than a threshold that is a plural number, an operation mode of the car is switched from a general mode in which a human is allowed to enter the car to a dedicated mode in which the human is prohibited from entering the car.

12 Claims, 7 Drawing Sheets

(51) Int. Cl.
*B66B 1/24* (2006.01)
*B66B 1/46* (2006.01)
*B66B 5/00* (2006.01)

(52) U.S. Cl.
CPC .......... *B66B 1/3461* (2013.01); *B66B 1/3476* (2013.01); *B66B 1/468* (2013.01); *B66B 5/0012* (2013.01); *B66B 2201/21* (2013.01); *B66B 2201/403* (2013.01); *B66B 2201/405* (2013.01); *B66B 2201/4607* (2013.01)

(58) Field of Classification Search
CPC ................ B66B 1/468; B66B 2201/21; B66B 2201/222; B66B 2201/23; B66B 2201/403; B66B 2201/4607; B66B 2201/104; B66B 1/3446; B60W 60/0025
See application file for complete search history.

(56) References Cited

U.S. PATENT DOCUMENTS

2022/0194737 A1* 6/2022 Oda ...................... B66B 1/3461
2025/0128910 A1* 4/2025 Sengoku ............... B66B 1/2466

FOREIGN PATENT DOCUMENTS

| JP | 2005-053670 | A |   | 3/2005 |
|----|-------------|---|---|--------|
| JP | 4655566     | B2 |  | 3/2011 |
| JP | 2011-076149 | A |   | 4/2011 |
| JP | 6635337     | B2 |  | 1/2020 |
| JP | 2020111394  | A | * | 7/2020 |
| KR | 20240035011 | A | * | 3/2024 |
| KR | 20250053356 | A | * | 4/2025 |

* cited by examiner

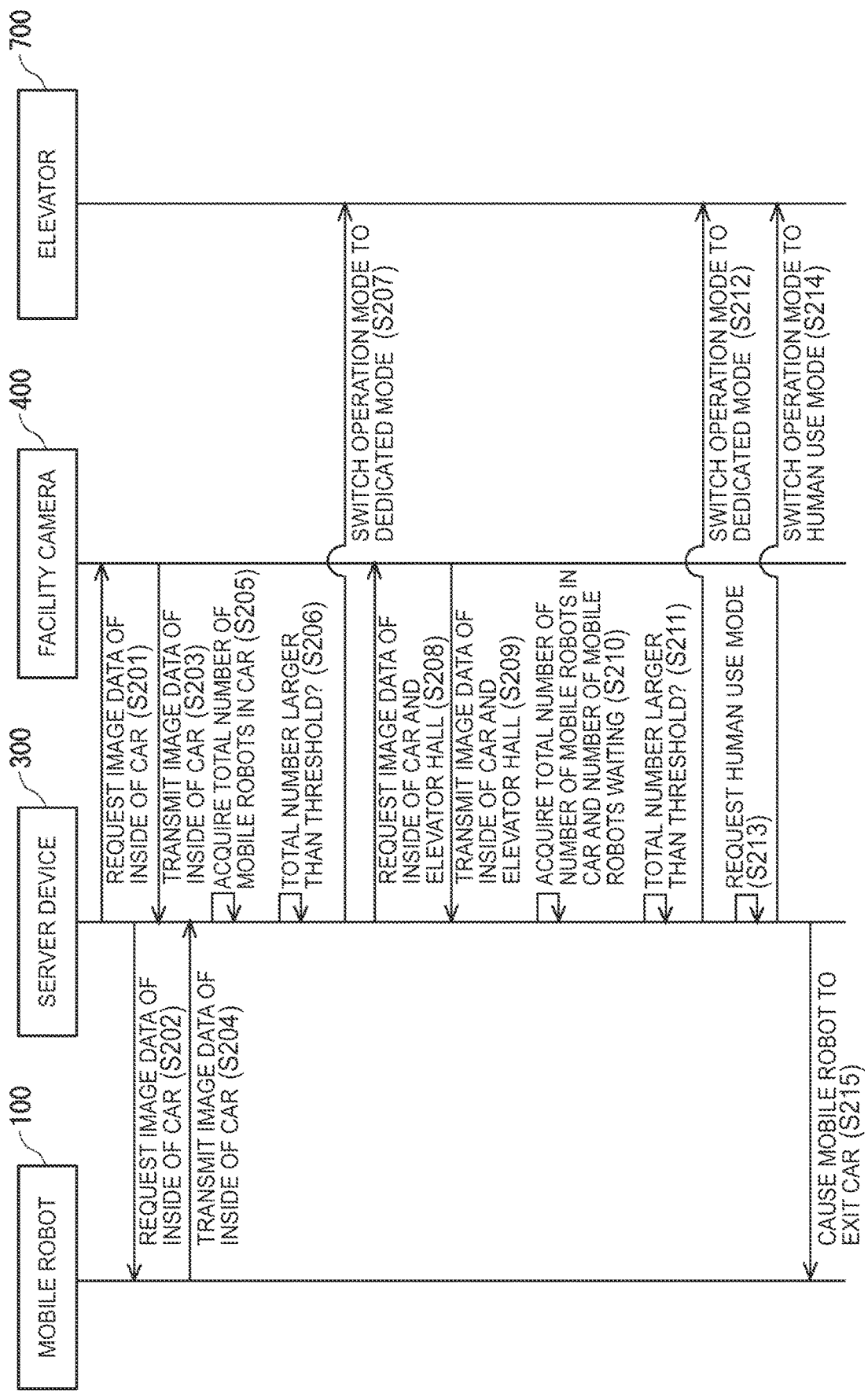

AUTONOMOUS MOBILE SYSTEM, AUTONOMOUS MOBILE METHOD, AND AUTONOMOUS MOBILE PROGRAM

CROSS-REFERENCE TO RELATED APPLICATION

This application claims priority to Japanese Patent Application No. 2020-211485 filed on Dec. 21, 2020, incorporated herein by reference in its entirety.

BACKGROUND

1. Technical Field

The present disclosure relates to an autonomous mobile system, an autonomous mobile method and an autonomous mobile program.

2. Description of Related Art

Japanese Patent No. 6635337 (JP 6635337 B) discloses an elevator control system that controls an elevator car to be switched between a user mode in which a user can use the elevator car and a robot mode in which only a mobile robot can use the elevator car. Switching to the robot mode occurs based on that the system receives a switching request. The switching request is made when the robot needs to move across floors.

SUMMARY

In the robot mode as described above, any human can enter the elevator car that is being used by the robot, and operation efficiency of the elevator decreases. By making a human wait, the robot that is to use the elevator after that may further be postponed, and the operation efficiency of the robot may decrease as a result.

The present disclosure has been made to solve such an issue, and provides an autonomous mobile system, an autonomous mobile method, and an autonomous mobile program capable of improving the operation efficiency including the entire facility.

An autonomous mobile system according to an embodiment is an autonomous mobile system that autonomously moves in a facility provided with an elevator. When the total number of the autonomous mobile systems including other autonomous mobile systems in a car of the elevator is larger than a threshold that is a plural number, an operation mode of the car is switched from a general mode in which a human is allowed to enter the car to a dedicated mode in which the human is prohibited from entering the car. With this configuration, it is possible to improve the operation efficiency including the entire facility.

In the above autonomous mobile system, when the total number in which the number of the autonomous mobile systems waiting for entering the car is added to the number of the autonomous mobile systems in the car is larger than the threshold, the operation mode of the car may be switched from the general mode to the dedicated mode. With this configuration, the autonomous mobile system waiting for entering the car can be caused to enter the car.

In the above autonomous mobile system, in the dedicated mode, a call switch that is disposed on a floor where the car stops and that calls the car may be disabled. With this configuration, the efficiency of the dedicated mode can be improved.

In the above autonomous mobile system, when a human use mode having a higher priority than the dedicated mode is requested, the operation mode may be switched from the dedicated mode to the human use mode. With this configuration, the human use mode can be prioritized.

In the above autonomous mobile system, when the operation mode is switched from the dedicated mode to the human use mode, the autonomous mobile system may exit the car. With this configuration, the human use mode can be prioritized.

An autonomous mobile system according to an embodiment includes an autonomous mobile device that autonomously moves in a facility provided with an elevator, and a server device that transmits and receives traveling information to and from the autonomous mobile device and controls lifting and lowering of a car of the elevator. When the total number of the autonomous mobile devices in the car of the elevator is larger than a threshold that is a plural number, the server device switches an operation mode of the car from a general mode in which a human is allowed to enter the car to a dedicated mode in which the human is prohibited from entering the car. With this configuration, it is possible to improve the operation efficiency including the entire facility.

In the above autonomous mobile system, when the total number in which the number of the autonomous mobile devices waiting for entering the car is added to the number of the autonomous mobile devices in the car is larger than the threshold, the server device may switch the operation mode of the car from the general mode to the dedicated mode. With this configuration, the autonomous mobile device waiting for entering the car can be caused to enter the car.

In the above autonomous mobile system, in the dedicated mode, the server device may disable a call switch that is disposed on a floor where the car stops and that calls the car. With this configuration, the efficiency of the dedicated mode can be improved.

In the above autonomous mobile system, when a human use mode having a higher priority than the dedicated mode is requested, the server device may switch the operation mode from the dedicated mode to the human use mode. With this configuration, the human use mode can be prioritized.

In the above autonomous mobile system, when the operation mode is switched from the dedicated mode to the human use mode, the server device may cause the autonomous mobile device to exit the car. With this configuration, the human use mode can be prioritized.

An autonomous mobile method according to the present embodiment is an autonomous mobile method for an autonomous mobile device that autonomously moves in a facility provided with an elevator, and includes: a step of acquiring the total number of the autonomous mobile devices including other autonomous mobile devices in a car of the elevator; a step of determining whether the total number of the autonomous mobile devices in the car is larger than a threshold that is a plural number; and a step of switching an operation mode of the car from a general mode in which a human is allowed to enter the car to a dedicated mode in which the human is prohibited from entering the car when the total number is larger than the threshold. With this configuration, it is possible to improve the operation efficiency including the entire facility.

An autonomous movement program according to the present embodiment is an autonomous mobile program for an autonomous mobile device that autonomously moves in a facility provided with an elevator, and causes a computer to execute: acquisition of the total number of the autonomous mobile devices including other autonomous mobile devices in a car of the elevator; determination of whether the total number of the autonomous mobile devices in the car is larger than a threshold that is a plural number; and switching of an operation mode of the car from a general mode in which a human is allowed to enter the car to a dedicated mode in which the human is prohibited from entering the car when the total number is larger than the threshold. With this configuration, it is possible to improve the operation efficiency including the entire facility.

The present embodiment can provide an autonomous mobile system, an autonomous mobile method, and an autonomous mobile program capable of improving the operation efficiency including the entire facility.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a sequence diagram illustrating the operation of the autonomous mobile system according to the second embodiment.

DETAILED DESCRIPTION OF EMBODIMENTS

Hereinafter, the present disclosure will be described through embodiments of the disclosure, but the disclosures in the claims are not limited to the following embodiments. Moreover, not all of the configurations described in the embodiments are indispensable for solving the problem. For the sake of clarity, the following description and drawings have been omitted and simplified as appropriate. In each drawing, the same elements are designated by the same reference signs, and duplicate descriptions are omitted as necessary.

First Embodiment

An autonomous mobile system according to a first embodiment will be described. In the present embodiment, the autonomous mobile system may be replaced with an autonomous mobile device, or the autonomous mobile device may be replaced with an autonomous mobile system. Further, the autonomous mobile system according to the present embodiment may include the autonomous mobile device. The autonomous mobile device autonomously moves within a predetermined facility. The autonomous mobile device may be, for example, a mobile robot that autonomously moves, or a transportation robot that autonomously moves to transport an object. Hereinafter, a mobile robot will be described as an example of the autonomous mobile device. The mobile robot will be described separately in "Structure of Mobile Robot" and "Operation of Mobile Robot".

Structure of Mobile Robot

Figure 1:
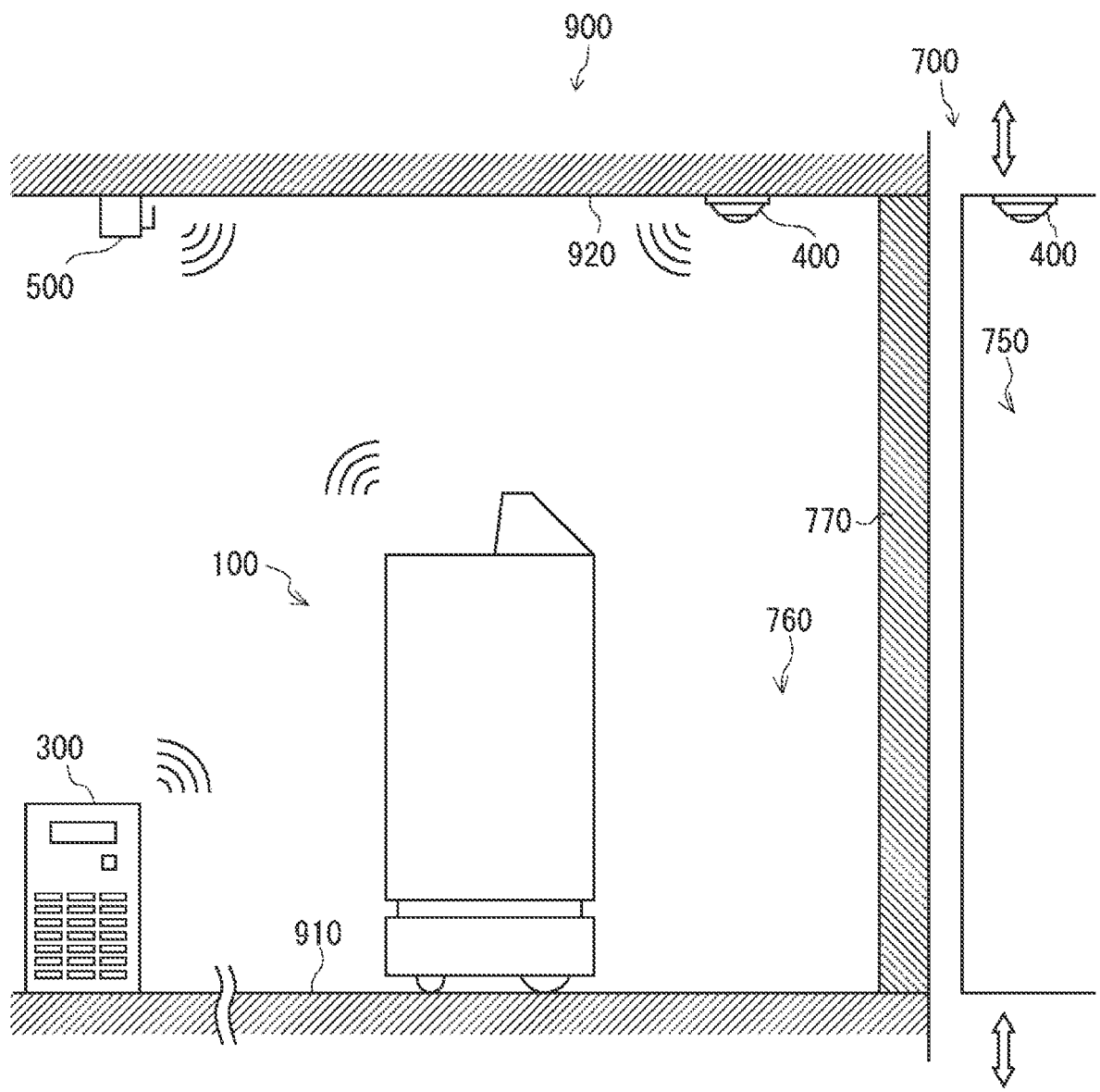
FIG. 1 is a schematic view illustrating a mobile robot according to a first embodiment.

FIG. 1 is a schematic view illustrating a mobile robot according to the first embodiment. As shown in FIG. 1, a mobile robot 100 is an example of the autonomous mobile device that autonomously moves in a facility 900 provided with an elevator 700. The facility 900 is, for example, a hospital. The facility 900 is not limited to a hospital, and may be a hotel, a shopping mall, or the like as long as the facility 900 is provided with the elevator 700 and the mobile robot 100 can move autonomously in the facility 900.

The mobile robot 100 autonomously moves on a floor surface 910 in the facility 900. A facility camera 400 is fixed in the facility 900. A plurality of the facility cameras 400 may be provided in the facility 900. For example, the facility camera 400 is fixed to a ceiling 920 of the facility 900, and captures images of surrounding areas of the facility camera 400 to generate image data.

The facility camera 400 may be fixed to the ceiling 920 of the floor where a car 750 of the elevator 700 stops and may capture an image of an elevator hall 760. The elevator hall 760 is disposed in the vicinity of an elevator door 770. Further, the facility camera 400 may be fixed to the ceiling 920 of the car 750 of the elevator 700 and may capture an image of the inside of the car 750. The car 750 is a box-shaped structure that accommodates humans and objects and is lifted and lowered at a position in contact with the elevator hall 760.

The mobile robot 100 and the facility camera 400 are connected to each other so as to be able to communicate with each other via information transmission techniques such as wireless communication. The mobile robot 100 and the facility camera 400 may be connected to each other so as to be able to directly communicate with each other, or may be connected to each other so as to be able to communicate with each other via an access point 500 and a server device 300. Therefore, the mobile robot 100 may acquire the image data directly from the facility camera 400, or may acquire the image data via the access point 500 and the server device 300.

The access point 500 is, for example, a wireless local area network (LAN) access point. The access point 500 is fixed in the facility 900 and acquires position information, traveling information, and the like from the mobile robot 100 located in a predetermined range in the periphery of the access point 500. A plurality of the access points 500 may be provided in the facility 900.

A plurality of the mobile robots 100 may autonomously move in the facility 900. The mobile robots 100 may be connected to each other so as to be able to communicate with each other via information transmission techniques such as wireless communication. The mobile robots 100 may be connected to each other so as to be able to directly communicate with each other, or may be connected to each other so as to be able to communicate with each other via the access point 500 and the server device 300.

The information transmitted and received among the mobile robot 100, the server device 300, and another mobile robot 100 may include mode information of the car 750 of the elevator 700. The mode information may include, for example, a general mode, a dedicated mode, and a human use mode. The general mode is a mode that allows the mobile robot 100 and a human to enter the car 750. The dedicated mode is a mode in which a human is prohibited from entering the car 750 and the mobile robot 100 is allowed to enter the car 750. The human use mode is a mode in which a human can enter the car 750 with priority over the mobile robot 100.

Figure 2:
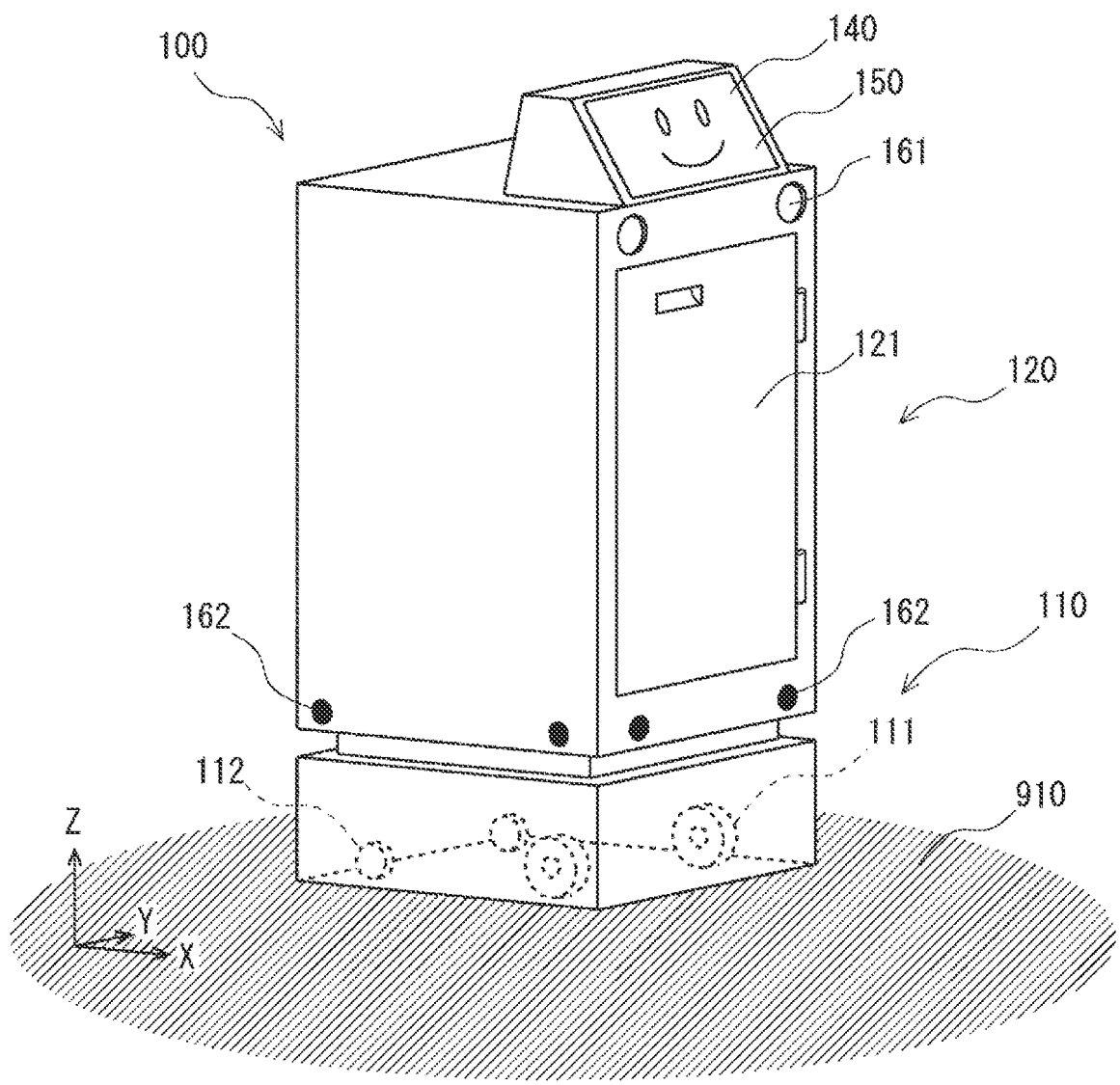
FIG. 2 is a perspective view illustrating the mobile robot according to the first embodiment.
Figure 3:
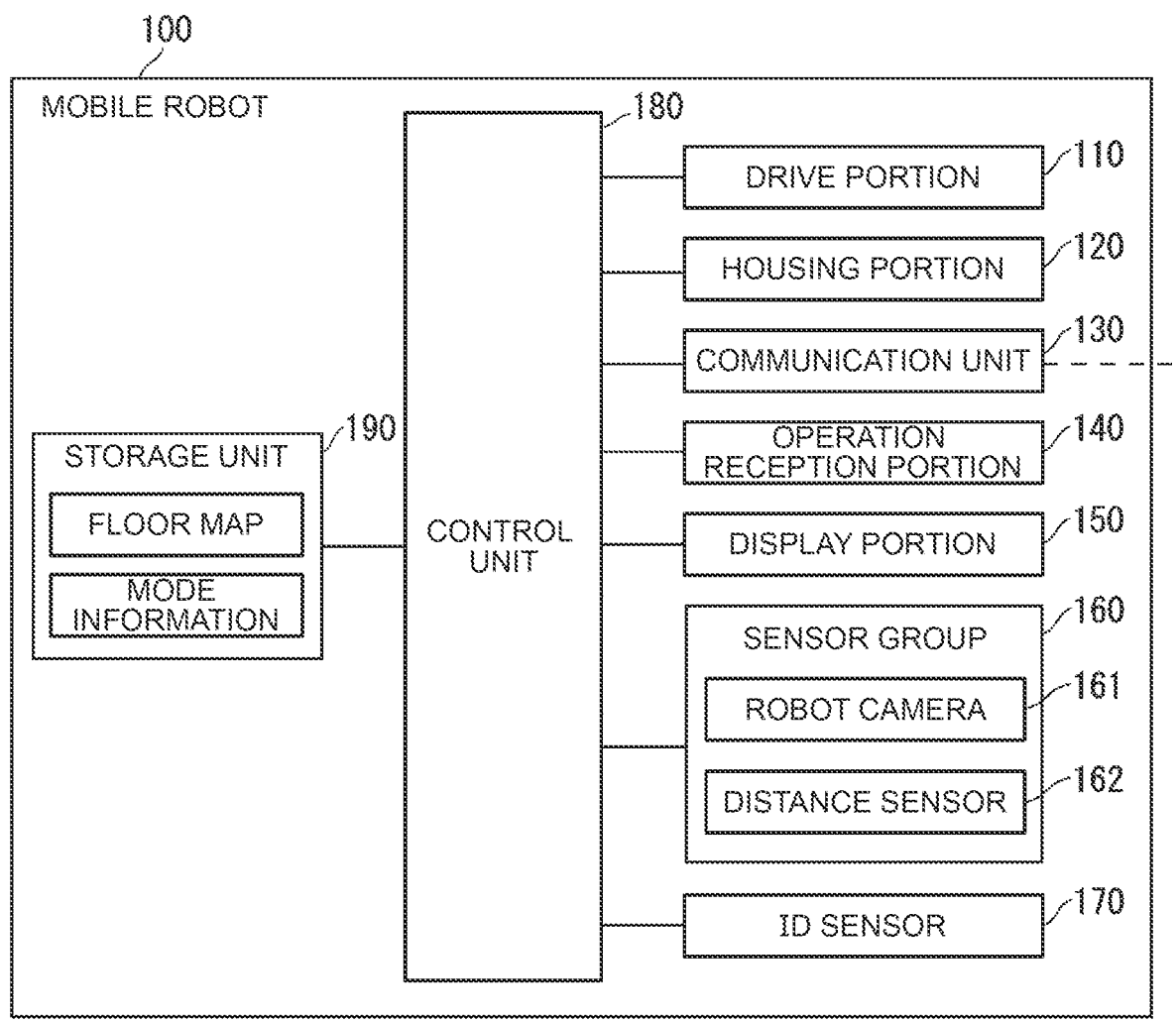
FIG. 3 is a block diagram illustrating the mobile robot according to the first embodiment.

FIG. 2 is a perspective view illustrating the mobile robot 100 according to the first embodiment. FIG. 3 is a block diagram illustrating the mobile robot 100 according to the first embodiment. As shown in FIGS. 2 and 3, the mobile robot 100 includes a drive portion 110, a housing portion 120, a communication unit 130, an operation reception portion 140, a display portion 150, a sensor group 160, an identification (ID) sensor 170, a control unit 180, and a storage unit 190.

As shown in FIG. 2, the mobile robot 100 is a mobile body that moves on the floor surface 910 that is a moving surface. Here, for convenience of explanation of the mobile robot 100, the XYZ orthogonal coordinate axis system is used. The floor surface 910 is the XY-plane, and the upper side is the +Z axis direction.

The drive portion 110 functions to move the mobile robot 100. The drive portion 110 includes two drive wheels 111 that are in contact with the floor surface 910 and are rotatable independently from each other about one rotation axis that extends in a direction (right-left direction or Y-axis direction in the drawing) perpendicular to a straight direction (front-back direction or X-axis direction in the drawing), and casters 112 in contact with the floor surface 910. The mobile robot 100 moves forward or rearward in a manner such that the drive wheels 111 disposed on the right and left sides are driven at the same rotation speed, and makes a turn by generating a difference in the rotation speed or rotation direction between the right and left drive wheels 111. The drive portion 110 drives the drive wheels 111 in accordance with commands from the control unit 180.

The housing portion 120 is disposed above the drive portion 110 of the mobile robot 100. The housing portion 120 may have a storage chamber door 121. When the storage chamber door 121 is opened, a storage chamber for storing a predetermined transported object is provided inside the housing portion 120. That is, the mobile robot 100 can also be a transportation robot that transports a predetermined object. The housing portion 120 may open and close the storage chamber door 121 in accordance with a command from the control unit 180.

As shown in FIG. 3, the communication unit 130 is an interface that is communicably connected to the outside. The communication unit 130 includes, for example, an antenna and a circuit that modulates or demodulates a signal transmitted through the antenna. The communication unit 130 receives the image data directly from the facility camera 400 or via the access point 500 and the server device 300.

Further, the communication unit 130 may receive information on the destination, information on whether movement is allowed, and mode information of the car 750 of the elevator 700 from the server device 300. Further, the communication unit 130 may transmit information related to the state of the mobile robot 100, position information, mode information, and the like to the server device 300. Further, the communication unit 130 may transmit and receive the position information, the image data, and the mode information to and from the other mobile robot 100 directly or via the access point 500 and the server device 300.

The communication unit 130 may periodically transmit a heartbeat signal to the server device 300. The heartbeat signal may include log data indicating the state of the mobile robot 100 in the chronological order. Further, the heartbeat signal may include the ID of the mobile robot 100 and the ID of the user.

The communication unit 130 connects to the control unit 180, outputs, to the control unit 180, a signal including information transmitted from the facility camera 400 and the server device 300, and transmits, to the server device 300, the signal output from the control unit 180.

The operation reception portion 140 receives an input operation from the user and transmits an operation signal to the control unit 180. The operation reception portion 140 may include, for example, an operation button, a touch panel superimposed on the display portion 150, or the like used for receiving an input operation from the user. The user operates the input operation reception portion 140 to turn on and off the power supply, open and close the storage chamber door 121, and the like.

The display portion 150 is provided, for example, so as to project from the upper surface of the housing portion 120. The display portion 150 is, for example, a display portion including a rectangular liquid crystal panel. The display portion 150 appropriately displays information in accordance with the command from the control unit 180. A touch panel that receives operations from the user may be superimposed on the display portion 150. The display portion 150 may display the mode information of the car 750 of the elevator 700.

The sensor group 160 includes a sensor that acquires data necessary for the mobile robot 100 to move autonomously. The sensor group 160 includes, for example, a robot camera 161 and a distance sensor 162. The sensor group 160 may include sensors other than the robot camera 161 and the distance sensor 162.

The robot camera 161 is disposed in an upper portion of the housing portion 120 and below the display portion 150, for example. In the robot camera 161, two camera units having the same angle of view may be disposed horizontally separated from each other. With this configuration, the images captured by each camera unit are output to the control unit 180 as the image data.

When the mobile robot 100 is located in the elevator hall 760, the robot camera 161 may capture an image of the elevator hall 760. When the mobile robot 100 is located in the car 750 of the elevator 700, the robot camera 161 may capture an image of the inside of the car 750.

The distance sensor 162 is disposed, for example, in the lower portion of the housing portion 120. The distance sensor 162 may be disposed in the lower portion of each of a surface on the +X-axis direction side, a surface on the −X-axis direction side, a surface on the +Y-axis direction side, and a surface on the −Y-axis direction side of the housing portion 120. The distance sensor 162 measures the distance of an object around the mobile robot 100. The control unit 180 recognizes the obstacle around the mobile robot 100 by analyzing the image data output by the robot camera 161 and the detection signals output by the distance sensor 162, and measures the distance between the mobile robot 100 and the obstacle.

The ID sensor 170 is provided, for example, in the vicinity of the display portion 150. The ID sensor 170 identifies the ID of the user who operates the mobile robot 100, and detects a unique identifier included in the ID card owned by each user. The ID sensor 170 includes, for example, an antenna for reading information on a wireless tag. The user brings the ID card close to the ID sensor 170 such that the mobile robot 100 is caused to recognize the ID of the user who is the operator.

The control unit 180 is an information processing device including an arithmetic device such as a central processing unit (CPU). The control unit 180 includes hardware provided in the control unit 180 and a program stored in the hardware. That is, processes executed by the control unit 180 are realized by either hardware or software.

The control unit 180 acquires various types of information from each configuration and issues a command to each configuration in accordance with the acquired information. For example, the control unit 180 detects the distance between the mobile robot 100 and the surrounding object from the image data acquired from the robot camera 161 and the information on the object around the mobile robot 100 acquired from the distance sensor 162. Then, the control unit 180 calculates a route to the destination from the detected distance, the position information, and the mode information. The control unit 180 commands the drive portion 110 to move along the calculated route. When executing such a process, the control unit 180 refers to information related to a floor map and the mode information of the car 750 of the elevator 700 that are stored in the storage unit 190.

Further, the control unit 180 may calculate the number of mobile robots 100 and humans waiting in the elevator hall 760 from the image data acquired from the facility camera 400 or the robot camera 161. Further, the control unit 180 may calculate the number of mobile robots 100 and humans in the car 750 of the elevator 700 from the image data acquired from the facility camera 400 or the robot camera 161.

The storage unit 190 includes a non-volatile memory such as a flash memory and a solid state drive (SSD). The storage unit 190 stores a floor map of a facility used by the mobile robot 100 for making autonomous movement. Further, the storage unit 190 stores the mode information of the car 750 of the elevator 700. The storage unit 190 is connected to the control unit 180, and outputs stored information to the control unit 180 in response to a request from the control unit 180.

As shown in FIG. 2, the mobile robot 100 has the +X-axis direction side on which the robot camera 161 is installed as the front. Various ideas can be adopted for how to define the front of the mobile robot 100. For example, the front can be defined based on how the sensor group 160 for recognizing the surrounding environment is disposed. Specifically, the +X-axis direction side of the housing portion 120 on which the sensor having high recognition ability is disposed or many sensors are disposed can be set to the front. Definition of the front as described above makes it possible for the mobile robot 100 to move while recognizing the surrounding environment more accurately. The mobile robot 100 according to the present embodiment also has the +X-axis direction side on which the robot camera 161 is disposed as the front.

Alternatively, the front can be defined based on how the display portion 150 is disposed. When the display portion 150 displays the face of the character or the like, the surrounding humans naturally recognize that the display portion 150 is the front of the mobile robot 100. Therefore, when the display surface side of the display portion 150 is set to the front, there is little discomfort to the surrounding humans. The mobile robot 100 according to the present embodiment also has the display surface side of the display portion 150 as the front.

Further, the front may be defined based on a shape of the housing of the mobile robot 100. For example, when the projected shape of the housing portion 120 on the traveling surface is rectangular, it is better to have the short side as the front than the longitudinal side as the front, whereby humans who pass each other are not obstructed during moving. That is, depending on the shape of the housing, there is a housing surface that is set as the front when the mobile robot 100 moves normally. The mobile robot 100 according to the present embodiment also has the short side of the rectangular shape as the front. As described above, for the mobile robot 100, the front is defined so as to match some ideas. However, which idea is used to define the front may be determined in consideration of the shape and role of the mobile robot.

Operation of Mobile Robot

Next, the operation of the mobile robot according to the present embodiment will be described. For example, the user turns on the power of the mobile robot 100. Then, the user inputs a desired task to the operation reception portion 140. When necessary, the ID sensor 170 identifies the ID of the user when the power is turned on or when the user operates the operation reception portion 140.

As a desired task, in order to transport the object, the user operates the operation reception portion 140 to open the storage chamber door 121 and store the object in the storage chamber. Then, the user operates the operation reception portion 140 to close the storage chamber door 121. Next, the user inputs the destination of the object using the operation reception portion 140. The control unit 180 of the mobile robot 100 searches for a route to the destination using the floor map and the mode information of the car 750 that are stored in the storage unit 190. The mobile robot 100 autonomously moves along the searched route.

Figure 4:
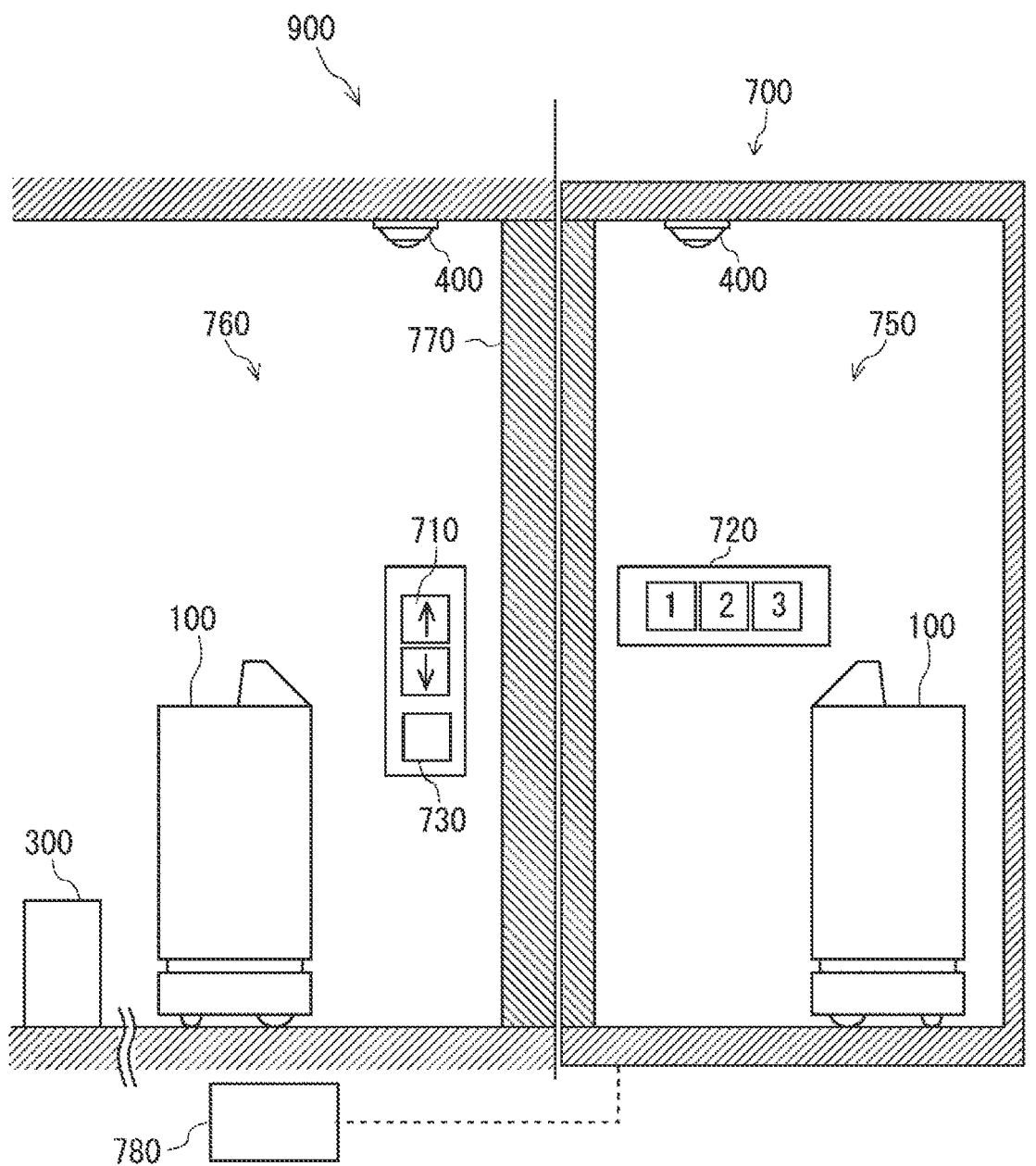
FIG. 4 is a conceptual diagram illustrating an elevator of a facility according to the first embodiment.

FIG. 4 is a conceptual diagram illustrating the elevator 700 of the facility 900 according to the first embodiment. As shown in FIG. 4, the facility 900 is provided with the elevator 700. An elevator control unit 780 provided in the facility 900 may control lifting and lowering of the car 750 of the elevator 700.

The elevator control unit 780 is communicably connected to a call switch 710, a destination switch 720, and a human use switch 730. The call switch 710, the destination switch 720, and the human use switch 730 may be communicably connected to the mobile robot 100 and the server device 300.

The call switch 710 is disposed, for example, in the vicinity of the elevator door 770 on each floor where the car 750 stops. The call switch 710 is used to call the car 750 of the elevator 700 to the current floor. Those who desire to ride the car 750 turn on the call switch 710. Then, the elevator control unit 780 lifts or lowers the car 750 to the floor where the call switch 710 is turned on and stops the car 750.

The destination switch 720 is disposed in the car 750. The destination switch 720 is used to select the destination floor of the car 750. The human in the car 750 selects the destination floor using the destination switch 720. Then, the elevator control unit 780 lifts or lowers the car 750 to the floor selected using the destination switch 720 and stops the car 750.

The human use switch 730 is disposed, for example, in the vicinity of the elevator door 770 on each floor where the car 750 stops. The human use switch 730 is used to call the car 750 of the elevator 700 to the current floor. Details of the human use switch 730 will be described later.

When the total weight of humans and objects entering the car 750 is equal to or more than the predetermined weight, the elevator control unit 780 may display that the weight is over, and sound the buzzer when more humans and objects try to enter. Further, when the weight is equal to or more than the predetermined weight, the elevator control unit 780 causes the car 750 to stop at the floor selected using the destination switch 720 only so as to avoid entry of more humans and objects. As described above, the elevator control unit 780 provided in the facility 900 controls lifting, lowering, and stop of the elevator 700.

The elevator control unit 780 may be communicably connected to the mobile robot 100 directly or via the server device 300 and the access point 500. The server device 300 may control some of the functions of the elevator control unit 780. Further, the server device 300 may have some of the functions of the elevator control unit 780. For example, the server device 300 may lift or lower the car 750 to the floor on which the call switch 710 is turned on and stop the car 750, or may lift or lower the car 750 to the floor selected using the destination switch 720 and stop the car 750. As described above, the server device 300 may control lifting and lowering of the car 750.

Figure 5:
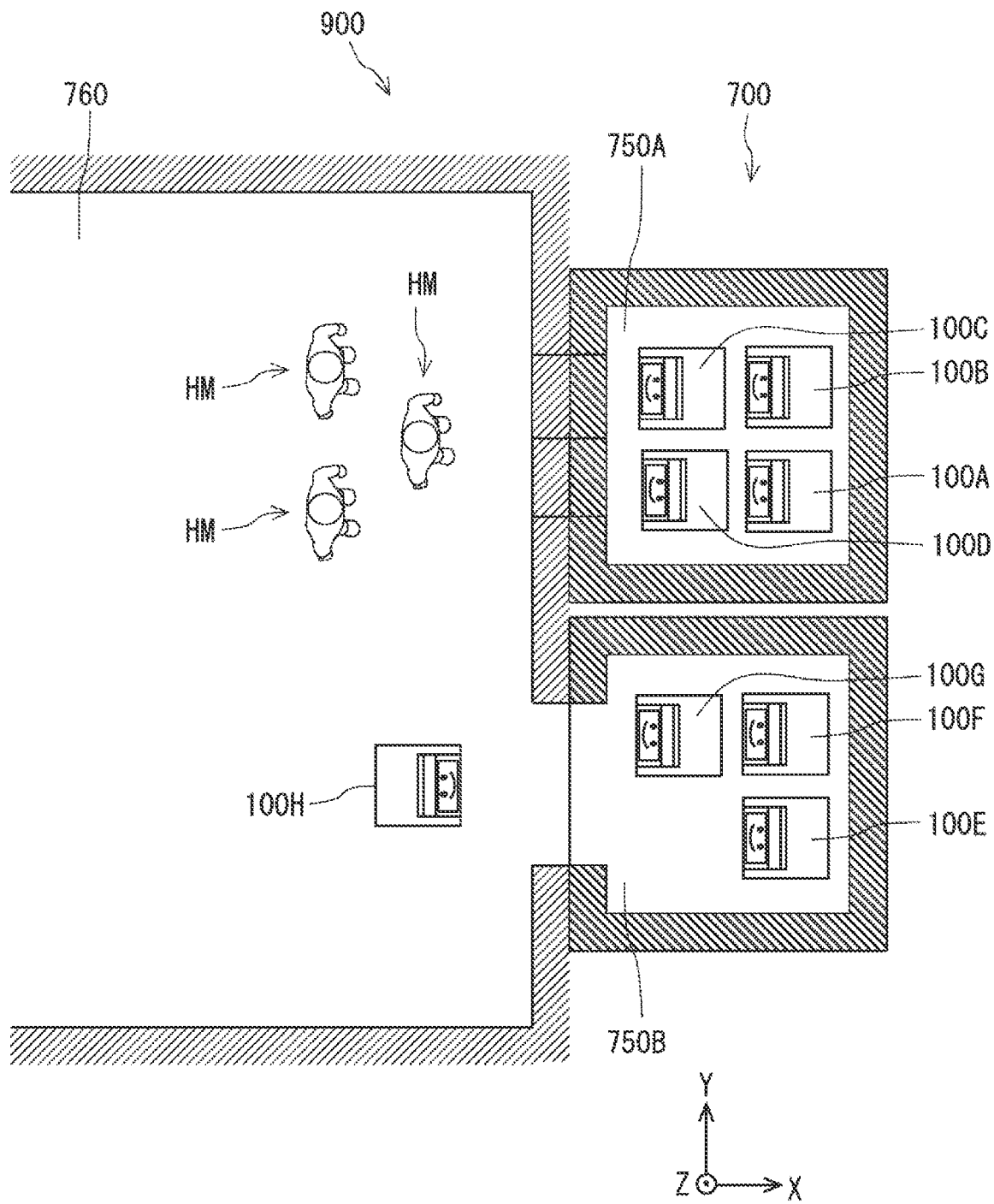
FIG. 5 is a plan view illustrating movement of the mobile robot in the facility provided with the elevators according to the first embodiment.

FIG. 5 is a plan view illustrating movements of the mobile robots 100 in the facility 900 provided with the elevators 700 according to the first embodiment. As shown in FIGS. 4 and 5, the mobile robots 100 and 100A to 100H autonomously move in the facility 900 provided with the elevators 700.

As shown in FIG. 5, for example, the mobile robot 100A entering a car 750A acquires the total number of mobile robots 100 including the other mobile robots 100B to 100D in the car 750A of the elevator 700. For example, the mobile robot 100A may calculate and acquire the total number of mobile robots 100 in the car 750A from the image data of the facility camera 400 in the car 750A. Further, the mobile robot 100A may calculate and acquire the total number of mobile robots 100 in the car 750A from the image data of the robot camera 161. Further, the mobile robot 100A may acquire the total number of mobile robots 100 in the car 750A from the server device 300. The server device 300 may calculate the total number of mobile robots 100 in the car 750A based on the position information acquired from the mobile robots 100A to 100D. Alternatively, the server device 300 may calculate the total number of mobile robots 100 in the car 750A from the image data of the facility camera 400 in the car 750A.

When the total number of mobile robots 100 including the other mobile robots 100B to 100D in the car 750A is larger than a threshold, the mobile robot 100A switches the operation mode of the car 750A from the general mode that allows entry of humans HM to the dedicated mode that prohibits entry of the humans HM. Specifically, the threshold is set in advance. In some embodiments, the threshold is a plural number, and may be set to three by the user, for example. When the total number of mobile robots 100 in the car 750A (4 in FIG. 5) is larger than the threshold, the mobile robot 100A transmits, to the elevator control unit 780 or the server device 300, a switching signal for switching to the dedicated mode. The elevator control unit 780 or the server device 300 that has received the switching signal switches the operation mode of the car 750A from the general mode to the dedicated mode. Therefore, the humans HM cannot enter the car 750A of the elevator 700. As described above, the mobile robot 100A switches the operation mode of the car 750A from the general mode to the dedicated mode. Note that, the threshold is not limited to three, and may be one or two, or four or more. In some embodiments, the threshold is a plural number in consideration of efficiency.

The mobile robot 100A may disable the call switch 710 in the dedicated mode. For example, the mobile robot 100A transmits a disabling signal that disables the call switch 710 to the elevator control unit 780 or the server device 300. The elevator control unit 780 or the server device 300 that has received the disabling signal disables the call switch 710 such that the human HM cannot turn on the call switch 710.

With this configuration, the humans HM waiting for the car 750A notice that the call switch 710 does not respond even when the call switch 710 is pressed, and recognize that the car 750A is in the dedicated mode. Therefore, the humans HM waiting for the car 750A move to use another car 750.

The total number of mobile robots 100 to be compared with the threshold may be the total number in which the number of mobile robots 100 waiting for entering the car 750 is added to the number of mobile robots 100 in the car 750. For example, the mobile robot 100E entering a car 750B acquires the image data of the facility camera 400 disposed in the elevator hall 760. Then, the mobile robot 100E may calculate the number of mobile robot 100H waiting for entering the car 750B from the acquired image data.

With this process, the mobile robot 100E acquires the total number in which the number of mobile robot 100H waiting for entering the car 750B is added to the number of mobile robots 100E to 100G in the car 750B. Then, when the total number acquired is larger than the threshold, the mobile robot 100E switches the operation mode of the car 750B from the general mode to the dedicated mode. In this case as well, the mobile robot 100E may disable the call switch 710 disposed on the floor.

There may be cases where the elevator 700 is desired to be urgently used, such as when a stretcher carrying an urgent patient is transported or when an urgent blood transfusion is transported. As described above, the human use mode in which a human urgently uses the elevator 700 is set to have a higher priority than the general mode and the dedicated mode. Therefore, when the human use mode having a higher priority than the dedicated mode is requested by the human use switch 730, the mobile robot 100 switches the operation mode from the dedicated mode to the human use mode.

When the human use switch 730 is turned on, the car 750 of the elevator 700 can be preferentially called to the current floor. Specifically, even when the operation mode of the car 750 is the general mode or the dedicated mode, turning on of the human use switch 730 forcibly switches the operation mode to the human use mode and calls the car 750 to the current floor. With this process, the user who has called the car 750 using the human use switch 730 can enter the car 750.

Note that, when the mobile robot 100 is in the car 750 and there is no space in the car 750 for the user who has called the car 750, the mobile robot 100 exits the car 750. As described above, the mobile robot 100 exits the car 750 when the operation mode is switched from the dedicated mode to the human use mode.

Figure 6:
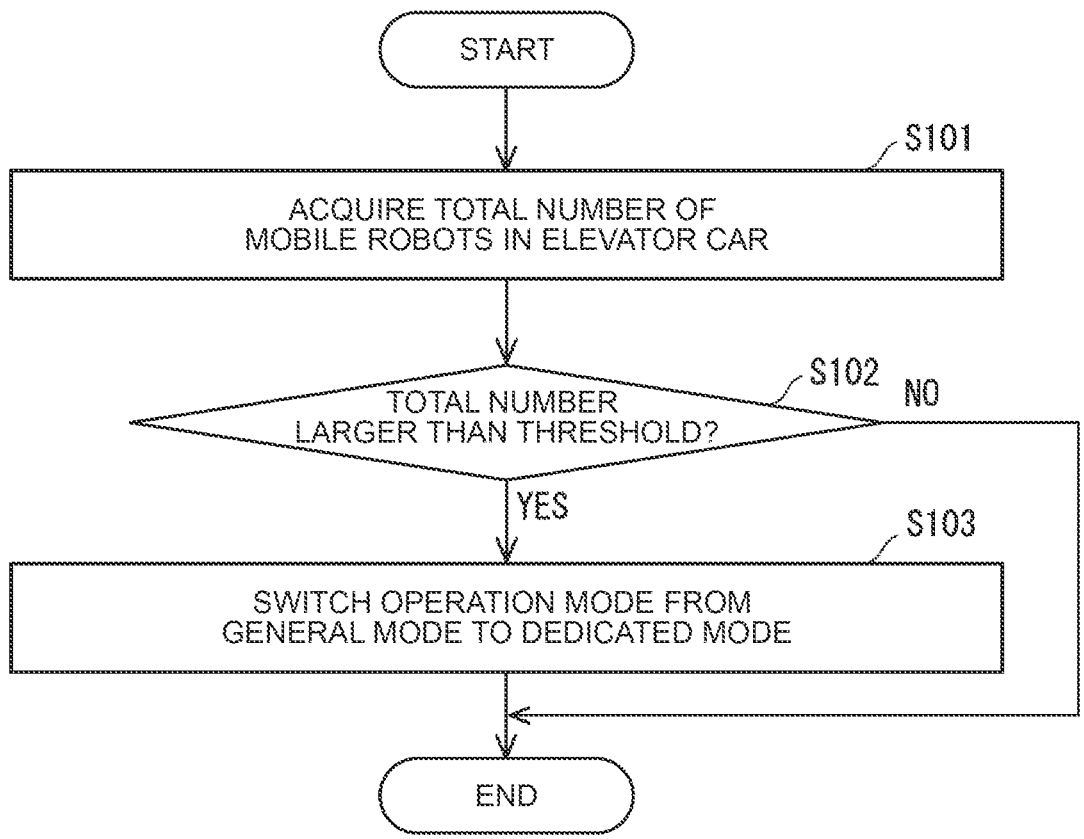
FIG. 6 is a flowchart illustrating an autonomous mobile method for the mobile robot in the facility having the elevator according to the first embodiment.

The operation to move the mobile robot 100 in the facility 900 will be described with reference to the flowchart. FIG. 6 is a flowchart illustrating an autonomous mobile method for the mobile robot 100 in the facility 900 having the elevator 700 according to the first embodiment.

As shown in step S101 of FIG. 6, the mobile robot 100 acquires the total number of the mobile robots 100 including the other mobile robots 100 in the car 750 of the elevator 700. For example, the mobile robot 100 may calculate and acquire the total number of the mobile robots 100 in the car 750 from the image data of the facility camera 400 in the car 750. Further, the mobile robot 100 may calculate and acquire the total number of the mobile robots 100 in the car 750 from the image data of the robot camera 161.

Next, as shown in step S102, the mobile robot 100 determines whether the total number of the mobile robots 100 in the car 750 of the elevator 700 is larger than the threshold. In step S102, when the total number is equal to or less than the threshold, the process ends.

On the other hand, in step S102, when the total number is larger than the threshold, the operation mode of the car 750 is switched from the general mode to the dedicated mode as shown in step S103.

When the total number of mobile robots 100 is acquired in step S101, the total number in which the number of mobile robots 100 waiting for entering the car 750 is added to the number of mobile robots 100 in the car 750 may be acquired. In this case, when the mobile robot 100 determines whether the total number in step S102 is larger than the threshold, the mobile robot 100 determines whether the total number including the number of mobile robots 100 waiting for entering the car 750 is larger than the threshold.

Further, in the step of switching the operation mode to the dedicated mode, the mobile robot 100 may disable the call switch 710 that calls the car 750 disposed on the floor where the car 750 stops.

When the human use mode having a higher priority than the dedicated mode is requested after the step of switching the operation mode of the car 750 to the dedicated mode in step S103, the mobile robot 100 may switch the operation mode from the dedicated mode to the human use mode. In that case, the mobile robot 100 may exit the car 750.

Next, the effect of the present embodiment will be described. When the total number of mobile robots 100 in the car 750 of the elevator 700 is larger than the threshold, the mobile robot 100 according to the present embodiment switches the operation mode to the dedicated mode. Therefore, as long as the total number of mobile robots 100 does not exceed the threshold, humans can also enter the car 750. With this configuration, the operation efficiency of the elevator can also be improved and the operation efficiency of the mobile robot 100 can be improved.

Further, the total number of mobile robots 100 may include the number of mobile robots 100 waiting for entering the car 750. Therefore, the mobile robot 100 waiting for entering the car 750 can enter the car 750 as long as the total number of the mobile robots 100 does not exceed the threshold. Therefore, the operation efficiency of the mobile robot 100 can be improved.

In the dedicated mode, the call switch 710 disposed on the floor where the car 750 stops is disabled. With this configuration, the car 750 that humans are prohibited from entry does not stop on the floor where humans are waiting. Therefore, the efficiency of the dedicated mode can be improved.

Further, when the human use mode having a higher priority than the dedicated mode is requested, the operation mode is switched to the human use mode. Therefore, humans and objects with high urgency can enter the car 750.

Second Embodiment

Next, an autonomous mobile system according to a second embodiment will be described. The autonomous mobile system according to the present embodiment is a system that controls an autonomous mobile device that autonomously moves in the facility 900 provided with the elevator 700. The autonomous mobile system will be described separately in "Configuration of Autonomous Mobile System" and "Operation of Autonomous Mobile System".

Configuration of Autonomous Mobile System

The autonomous mobile system includes the mobile robot 100. The autonomous mobile system may include a plurality of the mobile robots 100. Further, the autonomous mobile system may include the server device 300 in addition to the mobile robot 100.

Mobile Robot

The configuration of the mobile robot 100 according to the present embodiment is the same as that of the above-described first embodiment. The mobile robot 100 according to the present embodiment may cause the server device 300 to execute some of the functions of the mobile robot 100 according to the first embodiment.

For example, the server device 300 may be caused to acquire the total number of the mobile robots 100 in the car 750. Further, the server device 300 may switch the operation mode of the car 750.

Server Device

The server device 300 is, for example, a computer having a communication function. The server device 300 may be installed at any place as long as the server device 300 can communicate with each configuration of the autonomous mobile system. The server device 300 transmits and receives traveling information to and from the mobile robot 100. Further, the server device 300 may control the elevator control unit 780 to control lifting and lowering of the car 750 of the elevator 700, or may control lifting and lowering of the car 750 of the elevator 700 instead of the elevator control unit 780.

Figure 7:
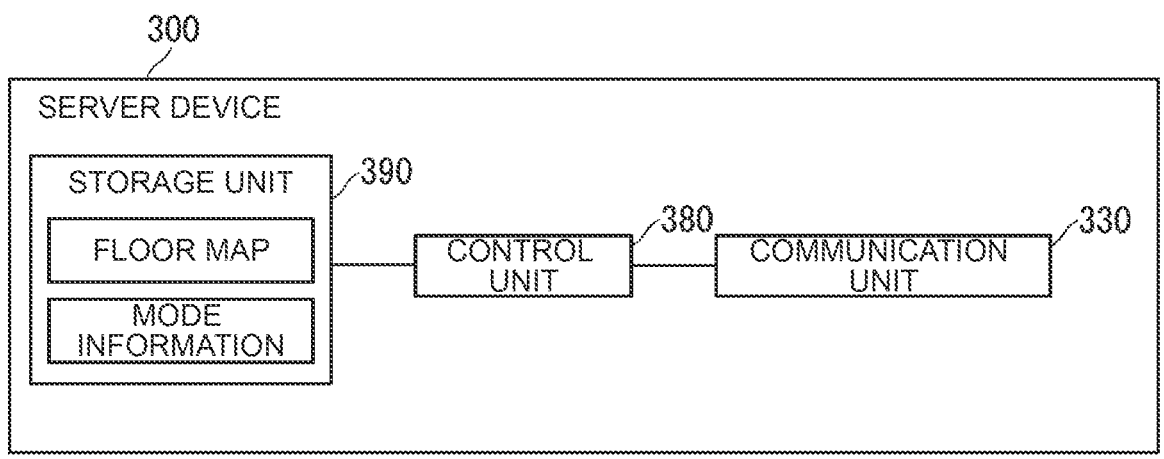
FIG. 7 is a block diagram illustrating a server device according to a second embodiment.

FIG. 7 is a block diagram illustrating a server device according to the second embodiment. As shown in FIG. 7, the server device 300 includes a communication unit 330, a control unit 380, and a storage unit 390.

The communication unit 330 communicates with the mobile robot 100 individually. The communication unit 330 outputs a signal received from each configuration to the control unit 380. Further, the communication unit 330 appropriately transmits a signal output from the control unit 380 to each configuration. The communication unit 330 may include a router device for performing communication between the server device 300 and a plurality of configurations. The communication unit 330 may have a plurality of communication units different for each component to communicate with each other in order to communicate with the server device 300 and the configurations. The communication unit 330 may be communicably connected to each configuration via an intranet line or the Internet line.

The control unit 380 is configured by an arithmetic device such as a CPU and executes various types of information processing. The control unit 380 may acquire the total number of mobile robots 100 in the car 750 and mobile robots waiting in the elevator hall 760. Further, the control unit 380 may determine whether the acquired total number is larger than the threshold. Further, the control unit 380 may switch the operation mode of the car 750.

The storage unit 390 includes a non-volatile memory such as a flash memory and an SSD. The storage unit 390 stores the floor map of the facility used by the mobile robot 100 for autonomously moving. Further, the storage unit 390 stores the mode information of the operation of the car 750 of the elevator 700. The storage unit 390 is connected to the control unit 380, and outputs stored information to the control unit 380 in response to a request from the control unit 380.

Operation of Autonomous Mobile System

Next, the operation of the autonomous mobile system will be described. FIG. 8 is a sequence diagram illustrating the operation of the autonomous mobile system according to the second embodiment.

As shown in step S201 in FIG. 8, the server device 300 requests the facility camera 400 for transmitting the image data of the inside of the car 750 of the elevator 700. As shown in step S202, the server device 300 may request the mobile robot 100 in the car 750 for transmitting the image data.

Next, as shown in steps S203 and S204, the facility camera 400 or the mobile robot 100 transmits the image data to the server device 300. With this process, the server device 300 acquires the image data of the inside of the car 750 of the elevator 700.

Next, as shown in step S205, the server device 300 acquires the total number of mobile robots 100 in the car 750. Specifically, the server device 300 calculates and acquires the total number of mobile robots 100 in the car 750 from the image data of the inside of the car 750.

Next, as shown in step S206, the server device 300 determines whether the total number of mobile robots 100 in the car 750 of the elevator 700 is larger than the threshold. When the total number is equal to or less than the threshold, the process ends.

Next, as shown in step S207, when the total number is larger than the threshold, the server device 300 switches the operation mode of the car 750 of the elevator 700 from the general mode to the dedicated mode.

Further, as shown in step S208, the server device 300 may request the facility cameras 400 for transmitting the image data of the inside of the car 750 and the elevator hall 760. On the other hand, as shown in step S209, the facility cameras 400 transmit the image data of the inside of the car 750 and the elevator hall 760 to the server device 300. With this process, the server device 300 acquires the image data of the inside of the car 750 and in the elevator hall 760.

Next, as shown in step S210, the server device 300 acquires the total number of the number of mobile robots 100 in the car 750 and the number of mobile robots 100 waiting in the elevator hall 760.

Next, as shown in step S211, the server device 300 determines whether the total number is larger than the threshold. When the total number is equal to or less than the threshold, the process ends.

Next, as shown in step S212, when the total number in which the number of mobile robots 100 waiting for entering the car 750 is added to the number of mobile robots 100 in the car 750 is larger than the threshold, the server device 300 switches the operation mode of the car 750 from the general mode to the dedicated mode. Note that, in the dedicated mode, the server device 300 may disable the call switch 710 disposed on the floor where the car 750 stops.

Further, when the human use mode having a higher priority than the dedicated mode is requested as shown in step S213, the server device 300 switches the operation mode from the dedicated mode to the human use mode as shown in step S214. In this case, as shown in step S215, the server device 300 causes the mobile robot 100 to exit the car 750.

According to the present embodiment, when the total number of mobile robots 100 in the car 750 of the elevator 700 is larger than the threshold, the server device 300 switches the operation mode of the car 750 to the dedicated mode. Therefore, the operation efficiency of the elevator can be improved, and the operation efficiency of the mobile robot 100 can also be improved. In addition, the server device 300 can take on some functions of the mobile robot 100. Therefore, the load on the mobile robot 100 can be reduced, and the processing speed of the mobile robot 100 can also be improved. Other configurations, operations and effects are included in the description of the first embodiment.

The present disclosure is not limited to the above embodiment, and can be appropriately modified without departing from the spirit. For example, a combination of the configurations of the first and second embodiments is also included in the scope of the technical idea of the present embodiment. In addition, the autonomous mobile method and the autonomous mobile program shown below are also included in the scope of the technical idea of the present embodiment.

APPENDIX 1

An autonomous mobile method for an autonomous mobile device that autonomously moves in a facility provided with an elevator includes: a step of acquiring the total number of the autonomous mobile devices including other autonomous mobile devices in a car of the elevator; a step of determining whether the total number of the autonomous mobile devices in the car is larger than a threshold that is a plural number; and a step of switching an operation mode of the car from a general mode in which a human is allowed to enter the car to a dedicated mode in which the human is prohibited from entering the car when the total number is larger than the threshold.

APPENDIX 2

In the autonomous mobile method according to Appendix 1, in the step of acquiring the total number of the autonomous mobile devices, the total number in which the number of the autonomous mobile devices waiting for entering the car is added to the number of the autonomous mobile devices in the car is acquired, and in the step of determining whether the total number is larger than the threshold, whether the total number in which the number of the autonomous mobile devices waiting for entering the car is added to the number of the autonomous mobile devices in the car is larger than the threshold is determined.

APPENDIX 3

In the autonomous mobile method according to Appendix 1 or 2, in the step of switching the operation mode to the dedicated mode, a call switch that is disposed on a floor where the car stops and that calls the car is disabled.

APPENDIX 4

The autonomous mobile method according to any one of Appendices 1 to 3 further includes a step of switching the operation mode from the dedicated mode to a human use mode having a higher priority than the dedicated mode when the human use mode is requested after the step of switching the operation mode to the dedicated mode.

APPENDIX 5

In the autonomous mobile method according to Appendix 4, in the step of switching the operation mode to the human use mode, the autonomous mobile device exits the car.

APPENDIX 6

An autonomous mobile program for an autonomous mobile device that autonomously moves in a facility provided with an elevator, the autonomous mobile program causing a computer to execute: acquisition of the total number of the autonomous mobile devices including other autonomous mobile devices in a car of the elevator; determination of whether the total number of the autonomous mobile devices in the car is larger than a threshold that is a plural number; and switching of an operation mode of the car from a general mode in which a human is allowed to enter the car to a dedicated mode in which the human is prohibited from entering the car when the total number is larger than the threshold.

APPENDIX 7

The autonomous mobile program according to Appendix 6 that causes the computer to execute: acquisition of the total number in which the number of the autonomous mobile devices waiting for entering the car is added to the number of the autonomous mobile devices in the car when the total number of the autonomous mobile devices is acquired; and determination of whether the total number in which the number of the autonomous mobile devices waiting for entering the car is added to the number of the autonomous mobile devices in the car is larger than the threshold when whether the total number is larger than the threshold is determined.

APPENDIX 8

The autonomous mobile program according to Appendix 6 or 7 that causes the computer to execute disabling of a call switch that is disposed on a floor where the car stops and that calls the car when the operation mode is switched to the dedicated mode.

APPENDIX 9

The autonomous mobile program according to any one of Appendices 6 to 8 that causes the computer to execute switching of the operation mode from the dedicated mode to a human use mode having a higher priority than the dedicated mode when the human use mode is requested after the operation mode is switched to the dedicated mode.

APPENDIX 10

The autonomous mobile program according to Appendix 9 that causes the computer to execute causing of the autonomous mobile device to exit the car when the operation mode is switched to the human use mode.

What is claimed is:

1. An autonomous mobile method for an autonomous mobile device that autonomously moves in a facility provided with an elevator, the autonomous mobile method comprising:
    a step of acquiring the total number of the autonomous mobile devices including other autonomous mobile devices in a car of the elevator;
    a step of determining whether the total number of the autonomous mobile devices in the car is larger than a threshold that is a plural number; and
    a step of switching an operation mode of the car from a general mode in which a human is allowed to enter the car to a dedicated mode in which the human is prohibited from entering the car when the total number is larger than the threshold.

2. The autonomous mobile method according to claim 1, wherein:
    in the step of acquiring the total number of the autonomous mobile devices, the total number in which the number of the autonomous mobile devices waiting for entering the car is added to the number of the autonomous mobile devices in the car is acquired; and
    in the step of determining whether the total number is larger than the threshold, whether the total number in which the number of the autonomous mobile devices waiting for entering the car is added to the number of the autonomous mobile devices in the car is larger than the threshold is determined.

3. The autonomous mobile method according to claim 1, wherein in the step of switching the operation mode to the dedicated mode, a call switch that is disposed on a floor where the car stops and that calls the car is disabled.

4. The autonomous mobile method according to claim 1, further comprising a step of switching the operation mode from the dedicated mode to a human use mode having a higher priority than the dedicated mode when the human use mode is requested after the step of switching the operation mode to the dedicated mode.

5. The autonomous mobile method according to claim 4, wherein in the step of switching the operation mode to the human use mode, the autonomous mobile device exits the car.

6. An autonomous mobile method for an autonomous mobile system that includes an autonomous mobile device that autonomously moves in a facility provided with an elevator, and a server device that transmits and receives traveling information to and from the autonomous mobile device and controls lifting and lowering of a car of the elevator, the autonomous mobile method further comprising a step of switching, by the server device, of an operation mode of the car from a general mode in which a human is allowed to enter the car to a dedicated mode in which the human is prohibited from entering the car when the total number of the autonomous mobile devices in the car of the elevator is larger than a threshold that is a plural number.

7. The autonomous mobile method according to claim 6, further comprising a step of switching, by the server device, the operation mode of the car from the general mode to the dedicated mode when the total number in which the number of the autonomous mobile devices waiting for entering the car is added to the number of the autonomous mobile devices in the car is larger than the threshold.

8. The autonomous mobile method according to claim 6, further comprising a step of disabling, by the server device, a call switch that is disposed on a floor where the car stops and that calls the car in the dedicated mode.

9. The autonomous mobile method according to claim 6, further comprising a step of switching, by the server device, the operation mode from the dedicated mode to a human use mode having a higher priority than the dedicated mode when the human use mode is requested.

10. The autonomous mobile method according to claim 9, further comprising a step of causing, by the server device, the autonomous mobile device to exit the car when the operation mode is switched from the dedicated mode to the human use mode.

11. An autonomous mobile system that autonomously moves in a facility provided with an elevator, wherein when the total number of the autonomous mobile systems including other autonomous mobile systems in a car of the elevator is larger than a threshold that is a plural number, an operation mode of the car is switched from a general mode in which a human is allowed to enter the car to a dedicated mode in which the human is prohibited from entering the car.

12. An autonomous mobile program for an autonomous mobile device that autonomously moves in a facility provided with an elevator, the autonomous mobile program causing a computer to execute:
- acquisition of the total number of the autonomous mobile devices including other autonomous mobile devices in a car of the elevator;
- determination of whether the total number of the autonomous mobile devices in the car is larger than a threshold that is a plural number; and
- switching of an operation mode of the car from a general mode in which a human is allowed to enter the car to a dedicated mode in which the human is prohibited from entering the car when the total number is larger than the threshold.

* * * * *